(12) United States Patent
Earley et al.

(10) Patent No.: US 12,001,483 B2
(45) Date of Patent: Jun. 4, 2024

(54) DIGITAL DATA PROCESSING SYSTEMS AND METHODS FOR DIGITAL CONTENT RETRIEVAL AND GENERATION

(71) Applicant: Earley Information Science, Inc., Carlilsle, MA (US)

(72) Inventors: Seth Earley, Carlisle, MA (US); Ashok Subramanian, Cambridge, MA (US); Prakash Govindarajulu, N. Billerica, MA (US); Jeannine Anne Bartlett, Hull, MA (US)

(73) Assignee: EARLEY INFORMATION SCIENCE, INC., Carlisle, MA (US)

( * ) Notice: Subject to any disclaimer, the term of this patent is extended or adjusted under 35 U.S.C. 154(b) by 0 days.

(21) Appl. No.: 17/537,391

(22) Filed: Nov. 29, 2021

(65) Prior Publication Data
US 2022/0147575 A1    May 12, 2022

Related U.S. Application Data

(63) Continuation of application No. 16/900,399, filed on Jun. 12, 2020, now Pat. No. 11,222,075.

(51) Int. Cl.
| | | |
|---|---|---|
| *G06F 16/00* | (2019.01) | |
| *G06F 16/9032* | (2019.01) | |
| *G06F 16/9035* | (2019.01) | |
| *H04L 51/02* | (2022.01) | |
| *G06F 16/30* | (2019.01) | |

(52) U.S. Cl.
CPC .... *G06F 16/90332* (2019.01); *G06F 16/9035* (2019.01); *H04L 51/02* (2013.01)

(58) Field of Classification Search
None
See application file for complete search history.

(56) References Cited

U.S. PATENT DOCUMENTS

| 10,540,585 B2 | 1/2020 | Norouzi | |
|---|---|---|---|
| 10,942,703 B2 * | 3/2021 | Martel | .................... G06F 40/30 |
| (Continued) | | | |

OTHER PUBLICATIONS

PCT Search Report for Application No. PCT/US2022/035607 dated Oct. 5, 2022.

(Continued)

*Primary Examiner* — Polina G Peach
(74) *Attorney, Agent, or Firm* — David J. Powsner; Davis Malm D'Agostine PC (57) ABSTRACT

A system for digital content that includes a content management system, an ontology manager and a chat bot, all executing and in communications coupling on a digital data processing system. The content manager stores a plurality of tagged digital assets. The ontology manager stores a list of (or otherwise maintains) plural facets, each corresponding to one or more tags of the content management system. One or more dialog segments and sequence identifiers are maintained in the ontology manager, as well, each associated with one or more other facets. The chat bot drives a conversation with an end-user based on facets identified as associated with assets in the content management system and using dialog segments associated with those facets, while excluding those facets not so identified. The digital data processing system generates and transmits to the user digital assets identified through that conversation.

14 Claims, 1 Drawing Sheet

(56) References Cited

U.S. PATENT DOCUMENTS

| | | |
|---|---|---|
| 10,957,320 B2 | 3/2021 | Polymenakos |
| 10,997,222 B2 | 5/2021 | Gupta |
| 11,126,798 B1 | 9/2021 | Lewis Meza |
| 11,222,075 B2 | 1/2022 | Earley et al. |
| 2004/0083092 A1 | 4/2004 | Valles |
| 2012/0016678 A1 | 1/2012 | Gruber et al. |
| 2012/0260263 A1 | 10/2012 | Edoja |
| 2013/0110519 A1 | 5/2013 | Dheyer et al. |
| 2016/0342685 A1 | 11/2016 | Basu et al. |
| 2017/0068670 A1 | 3/2017 | Orr et al. |
| 2018/0183737 A1 | 6/2018 | Subbarayan |
| 2018/0218042 A1 | 8/2018 | Krishnan |
| 2019/0034780 A1 | 1/2019 | Marin |
| 2019/0066677 A1* | 2/2019 | Jaygarl ............ G10L 15/30 |
| 2019/0171712 A1 | 6/2019 | Eisenzopf |
| 2019/0212879 A1 | 7/2019 | Anand |
| 2019/0258714 A1 | 8/2019 | Zhong |
| 2019/0325081 A1 | 10/2019 | Liu et al. |
| 2019/0340201 A1 | 11/2019 | Havens et al. |
| 2020/0082214 A1* | 3/2020 | Salammagari ......... G06N 3/006 |
| 2020/0152184 A1* | 5/2020 | Steedman Henderson .................. G06F 40/35 |
| 2020/0175964 A1* | 6/2020 | Eisenzopf ............ H04L 51/02 |
| 2020/0265339 A1 | 8/2020 | Eisenzopf |
| 2021/0073474 A1 | 3/2021 | Sengupta |
| 2021/0081615 A1* | 3/2021 | McRitchie ............ H04L 51/02 |
| 2021/0081848 A1 | 3/2021 | Polleri et al. |
| 2021/0097140 A1* | 4/2021 | Chatterjee ............ G06N 5/022 |
| 2021/0120206 A1 | 4/2021 | Liu et al. |
| 2021/0141799 A1* | 5/2021 | Steedman Henderson .................. G06N 3/045 |
| 2021/0174016 A1* | 6/2021 | Fox ........................ G06N 3/044 |
| 2021/0240935 A1 | 8/2021 | Galitsky |
| 2021/0279424 A1 | 9/2021 | Galitsky |
| 2021/0303555 A1* | 9/2021 | Kim .................. G06F 16/90332 |

OTHER PUBLICATIONS

PCT Search Report for Application No. PCT/US20/41906, dated Sep. 30, 2020.

* cited by examiner

DIGITAL DATA PROCESSING SYSTEMS AND METHODS FOR DIGITAL CONTENT RETRIEVAL AND GENERATION

This patent application is a continuation of U.S. patent application Ser. No. 16/900,399, filed Jun. 12, 2020, the teachings of which are incorporated by reference herein.

BACKGROUND OF THE INVENTION

The invention pertains to digital data processing and, more particularly, to information retrieval. It has application, by way of example, in assisting users in the retrieval of information from enterprise portals.

We are an information society and, perhaps more importantly, an information economy. We generate it. We store it. And, we are willing to pay to consume it. The big question, though, is how do we find it? Perhaps the biggest single ready source of information, the Internet, has led the drive in answering that question.

One of the early popular information retrieval systems was Yahoo! Directory, a hierarchical category-based tool—or "web directory"—for finding web sites. A user interested in finding information about health care insurance, for example, might click through a hierarchy of categories on the Yahoo! Directory portal, beginning with "business and economy" and proceeding through "business to business," "financial services," "insurance," and ending with "health" to find a listing of health insurers' websites of potential interest.

Exponential growth of the Internet, both in terms of the number of websites and number of users, rendered browsing on Yahoo! Directory, and like sites, obsolete. Not only did it prove impossible for human editors to categorize the myriad of sites coming online daily, increasingly large numbers of users lacked the expertise and fortitude to navigate the ever-growing hierarchical category directories.

As a consequence, web "searching" (as opposed to "browsing") has become the norm, through portals like Google, Bing, Baidu, and the like. Instead of requiring that users select among hierarchies of categories, the search engines locate individual web pages in response to user keyword and natural language requests. Some refer to this as the Ask-Tell model. Continuing the above example, the user interested in health care insurance can type that very term into a search portal and, with luck, will receive a listing of sites and pages of interest.

For those wishing information from a specific web site, say, of a health insurance provider, information retrieval has, to date, largely been through hierarchical category directories or, alternatively, through Ask-Tell searching hosted by the site owner and focused on content within that site. Again, continuing the example, this makes it possible for a user interested in offerings from a specific health insurer to browse its web site by product category or to search via Ask-Tell to find information of interest.

Just as with the Internet writ large, category searching of individual web sites has proven equally unworkable, except, for all but those with a few, simple offerings. Likewise, if the user's request depends on multiple variables, then the existing Ask-Tell model also tends to collapse. State of the art search engines usually cannot handle such requests. Instead, users (if they were savvy enough) would to search for information available in bits and pieces and then try to filter and assemble relevant parts together applying the appropriate context. This is tedious, at best, if workable at all.

As a consequence, chat bots (or "bots") have emerged as the next-generation search engine of choice for enterprises at least site-specific searches. For enterprises, the chat bot is viewed as one of the more effective marketing channels to conveniently and efficiently carryout two-way conversations with customers, potential customers, and other end users. In simple terms, chat bots are automated software conversational "intelligent assistants," typically, powered by machine learning which at its core is a simple way of achieving Artificial Intelligence (AI).

Ideally, chat bots powered by AI would learn and improve from real conversations with real end users. Reality has proven otherwise, Today's bots fail to understand the open-ended questions asked by the users and often do not know what to do next no matter how much content the bots have been fed or random training they have been given.

In view of the foregoing, an object of the invention is to provide improved methods and systems for digital data processing.

Another object is to provide such methods and systems as are suited for information retrieval.

Still another object is to provide such methods and systems as can be used to assist users in the retrieval of information from enterprise portals and other information sources.

SUMMARY OF THE INVENTION

The foregoing are among the objects attained by the invention, which provides in some aspects a system for digital content generation that includes a content management system, an ontology manager and a chat bot, all executing and in communications coupling on a digital data processing system. The content manager stores (or otherwise comprises), for each of a plurality of digital assets, an identifier of the respective digital asset and one or more associated tags (e.g., keywords or phrases) that characterize that asset. The digital assets, themselves, may be maintained in stores local to the content management system or otherwise.

The ontology manager stores a list of (or otherwise maintains) plural facets, each corresponding to one or more tags of the content management system and each characterizing one or more aspects of actual or potential digital assets in that system. The facets too may be keywords or phrases and, indeed, each facet may be identical to the tag to which it corresponds, though, it need not be. One or more dialog segments (e.g., queries or portions of conversations) are stored or otherwise maintained in the ontology manager, each associated with one or more facets. The ontology manager also keeps indicators, e.g., set and maintained through synchronization with the content management system, of facets whose corresponding tags are associated with digital assets in the content management system.

The chat bot drives a conversation with a user through a human machine interface (e.g., a special- or general-purpose software application such as a browser) based on facets identified as associated with assets in the content management system and using dialog segments associated with those facets, while excluding those facets not so identified. The digital data processing system generates and transmits to the user digital assets identified through that conversation.

Further aspects of the invention provide a system for digital content generation, e.g., as described above, in which the content management system and the ontology manager exchange facets and/or tags to synchronize, i.e., to establish correspondence between facets of the ontology manager and tags available for characterizing digital assets and/or potential digital assets in the content management system. During the sync, the content management system and ontology manager can also exchange information to identify tags (and, thereby, corresponding facets) that are associated with digital assets in the content management system.

Still further aspects of the invention provide a system for digital content generation, e.g., as described above, in which the chat bot identifies tags associated with facets designated by the user during the conversation. And, in related aspects, the invention provides such a system in which the content management system retrieves digital assets associated with those tags, and the browser or other human machine interface transmits those digital assets to the user.

Other aspects of the invention provide a system for digital content generation, e.g., as described above, in which the ontology manager stores (or otherwise comprises) sequence numbers associated with the plural facets. The chat bot, according to these aspects of the invention, drives the conversation as an additional function of those sequence numbers.

Yet still further aspects of the invention provide a system for digital content generation, e.g., as described above, in which the ontology manager stores (or otherwise comprises) one or more lexical indicators, each identifying one or more facets belonging to a common language, dialect or other lexicon, and in which the chat bot drives the conversation as an additional function of the lexical indicator associated with facets, including those associated with a designated lexical indicator and excluding those which are not.

In other aspects, the invention provides a system for digital content generation, e.g as described above, in which the chat bot drives conversations with any of text, radio boxes, check boxes and other user interface widgets. Format indicators that are associated with the facets and upon which the chat bot makes formatting selections are provided in the ontology.

Still further aspects of the invention provide a system for digital content generation, e.g., as described above, in which the ontology comprises a hierarchy of facets including one or more main facets and, associated with each of at least one of them, plural other facets descendant in the hierarchy on that main facet and corresponding to one or more tags of the content management system, a sequence number and one or more dialog segments.

In related aspects of the invention, where a like facet is descendant from two different main facets in the ontology's hierarchy, the chat bot—which normally drives the conversation based on sequence numbers—disregards those numbers when driving the portion of the conversation involving that like facet.

Other aspects of the invention provide a system for digital content generation, e.g., as described above, in which the chat bot drives the conversation as a stateless dialog with the user.

In related aspects of the invention, the chat bot searches the ontology hierarchy to identify a facet matching a user response during the conversation in order to determine how to further drive the conversation.

The foregoing and other aspects of the invention are evident in the discussion that follows, as well as in the drawings and the claims.

BRIEF DESCRIPTION OF THE DRAWINGS

A more complete understanding of the invention may be attained by reference to the drawings, in which.

DETAILED DESCRIPTION OF THE ILLUSTRATED EMBODIMENT

Architecture

Figure 1:
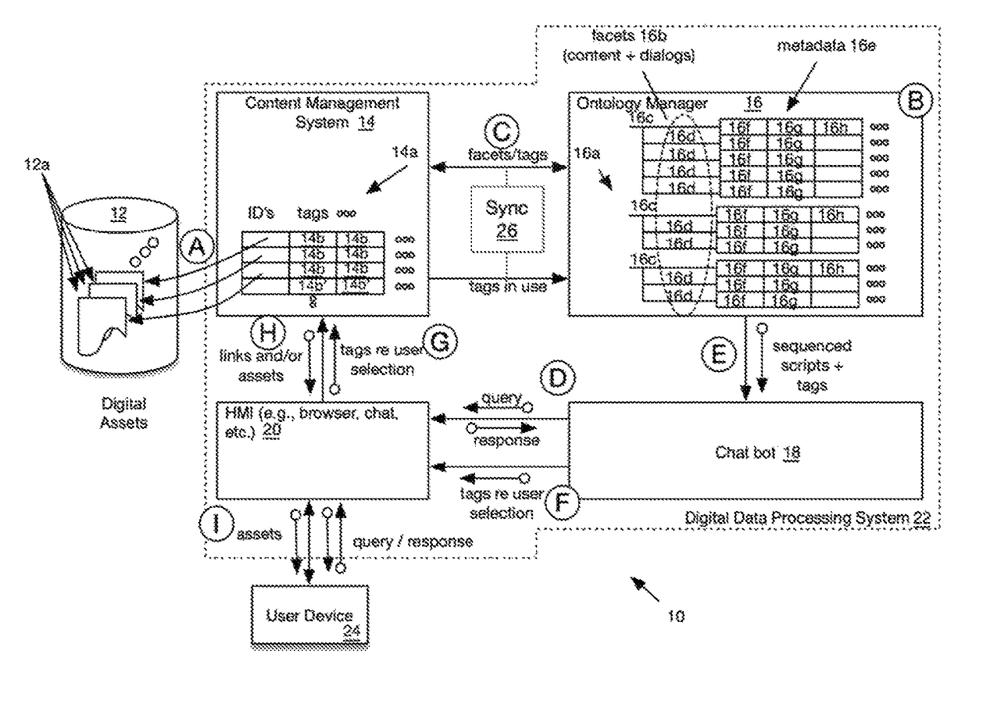
FIG. 1 depicts a system and method for digital content generation according to one practice of the invention.

FIG. 1 depicts a system 10 for digital content generation according to one practice of the invention. The illustrated system 10 includes a digital asset store 12 that is coupled with a content management system (CMS) 14. An ontology manager 16 is coupled with the CMS 14, as well as with a chat bot 18. Human machine interface 20 is coupled to the chat bot 18, as well as to the CMS 14. Illustrated elements 14-20 execute on digital data processing system 22, which in the illustrated embodiment comprises a mainframe computer, minicomputer, workstation, desktop computer, portable computer, or handheld device or other digital data processing device of the type known in the art, as adapted in accord with the teachings hereof. In other embodiments, those elements 14-20 may be implemented in distributed fashion or otherwise as per convention in the art, as adapted in accord with the teachings hereof, on a collection of two or more such digital data processing devices coupled for communication, e.g., over a local area network (LAN), wide area network (WAN), metropolitan area network (MAN), public network (Internet), or otherwise, in the conventional manner known in the art, as adapted in accord with the teachings hereof.

Digital asset store 12 comprises a conventional store of the type known in the art capable of storing electronic documents (such as, by way of nonlimiting example, PDFs, word processing documents, and/or spreadsheets, to name a few), images, videos, music and/or other digital works, all of the conventional type known in the art, as adapted in accord with the teachings hereof. The asset store 12 may be independent of digital data processing system 22, as shown in the drawing, yet coupled to it for communications via LAN, WAN, MAN, Internet, or otherwise, in the conventional manner known in the art, as adapted in accord with the teachings hereof. In other embodiments, the store 12 forms part of system 22 itself, e.g., as in the case of a document or other digital asset store contained on the "disk drive" local to system 22, again, in the conventional manner known in the art as adapted in accord with the teachings hereof.

User device 24 comprises a conventional digital data device of the type known in the art for end user access to digital data processing system 22. This may be a dumb- or smart-terminal that is directly or indirectly coupled to the system 22 per convention, as adapted in accord with the teachings hereof, or a digital data processing system in its own right, e.g., a mainframe computer, minicomputer, workstation, desktop computer, portable computer, handheld device, or other digital data processing device that is coupled for communications with system 22 via a LAN, WAN, MAN, Internet or otherwise, all per convention in the art as adapted in accord with the teachings hereof.

Content Management System (CMS) 14

CMS 14 comprises a conventional content management system of the type known in the art as adapted in accord with the teachings hereof that manages access to—and, more typically, as well, the storage of—digital assets of one or more of the types identified above (i.e., electronic documents, images, etc.). CMS 14 can, as well, manage the creation and modification of digital assets. CMS 14 of the illustrated embodiment comprises Adobe Experience Manager, although other CMSs of the type known in the art, whether commercially available in the marketplace or otherwise, may be used instead or in addition—all, as adapted in accord with the teachings hereof.

Relevant for purposes hereof, CMS 14 of the illustrated embodiment maintains records 14a (whether in a list, array, database or other data structure (consolidated, distributed or otherwise)), each of which associates a respective digital asset 12a—which may, itself, be identified in the record by pointer (such as a local or global URL) or other identifier—with one or more tags 14b characterizing the digital asset (i.e., describing its properties), e.g., in format, content, language or otherwise, all per convention in the art as adapted in accord with the teachings hereof. See FIG. 1, step (A).

Those tags 14b, which can comprise keywords or phrases, can be organized within the CMS 14 hierarchically or otherwise, again, as per convention as adapted in accord with the teachings hereof. By way of illustrative, non-limiting example, tags for digital assets pertaining to insurance might include, as main nodes or properties, the categories, AUDIENCE, CONTENT TYPE, HEALTH PLAN, OBJECTIVE and PROVIDER. Children of the AUDIENCE property might include, by way of further illustrative, non-limiting example, the tags BROKER, EMPLOYER, GOVERNMENT AGENCY, and PROFESSIONAL ORGANIZATION, whereas those of the HEALTH PLAN main node might include, by way of further illustrative, non-limiting example, the tags ACO, HMO and PPO.

Tags 14b in CMS 14 are created, managed and associated with digital assets via records 14a in the conventional manner of the art, as adapted in accord with the teachings hereof. Thus, for example, while such tags may be created in the CMS and placed in such records 14a in the first instance via an administrator or other operator directly or via a batch process, they may as well be created through invocation of an API, graphical user interface (GUI) or otherwise, e.g., as in the case of tags created by the synchronization module 26, as discussed below.

One such GUI, by way of illustrative, non-limiting example, permits an end user-operator to select, from among drop-down widgets associated with each of the main nodes/categories (e.g., AUDIENCE, CONTENT TYPE, HEALTH PLAN, OBJECTIVE, in the example, above) specific child tags (e.g., BROKER, EMPLOYER, GOVERNMENT AGENCY, and PROFESSIONAL ORGANIZATION for the AUDIENCE category, in the example above).

In addition to tags 14b that are associated with digital assets currently in store 12, the CMS 14 can store in records 14a or otherwise, tags 14b' available for use in characterizing potential digital assets 12a.

Ontology Manager 16

Ontology manager 16 is a conventional ontology manager of the type known in the art (as adapted in accord with the teachings hereof) that creates and manages an ontology 16a, that is, a list of keywords or phrases (collectively, "facets" 16b) that, like tags, characterize actual or potential digital assets in store 12 (and CMS 14). As above, those characteristics (or properties) may pertain to format, content, language or otherwise, by way of illustrative, non-limiting example. Ontology manager 16 of the illustrated embodiment comprises Wordmap® of Earley Information Science, the assignee hereof, although other ontology managers of the type known in the art, whether commercially available in the marketplace or otherwise, may be used instead or in addition—all, as adapted in accord with the teachings hereof.

Ontology 16a of the illustrated embodiment is organized hierarchically, as shown in the drawing, with main facets 16c that correspond to main nodes of the tags discussed above, and sub-facets (or children)—also known as "terms"—16d that descend hierarchically from respective main facets and that correspond to child nodes or tags in the discussion above.

In the illustrated embodiment, facets corresponding to tags in the CMS share the same name (or identifier) as the corresponding tag. Thus, continuing the example above, ontology 16a may include, as main facets 16c, the terms AUDIENCE, CONTENT TYPE, HEALTH PLAN, OBJECTIVE and PROVIDER; children or sub-facets 16d of the main facet AUDIENCE may include the sub-facets 16d BROKER, EMPLOYER, GOVERNMENT AGENCY, and PROFESSIONAL ORGANIZATION; and so forth, all in parallel to correspondingly named tags of CMS 14 and all by way of illustrative, non-limiting example.

Other embodiments may utilize facets 16b that, although corresponding to tags of the CMS 14, do not match them as in the example above. In those embodiments, metadata associated with the facets can be used to identify the specific correspondence, as discussed below.

A more complete listing of such an exemplary ontology for use with digital assets pertaining to insurance is reprinted below, with bracketed expressions indicating whether the facets are main facets 16c or sub-facets 16d:

Audience [16c]
  Broker [16d]
  Employer [16d]
  Government Agency [16d]
  Professional organization [16d]
Content type [16c]
  Articles [16d]
  Brochures [16d]
  Contracts [16d]
  Testimonials [16d]
Health plan [16c]
  ACO [16d]
  HMO [16d]
  PRO [16d]
Objective [16c]
  Assess [16d]
  Educate [16d]
  Influence [16d]
  Inform [16d]
Provider [16c]
  Assisted living [16d]
  Behavioral health [16d]
  Community-based care [16d]
  Urgent care [16d]

The ontology 16a is not limited to facets 16b that correspond to tags of the CMS 14: the ontology 16a may include other facets, as well. By way of non-limiting example, it may include sub-facets 16d that serve as scripts to direct conversations with end users to discern interests contemplated by the other facets of the ontology 16a. In the illustrated embodiments, those scripts are written in a markup-like language, though, other embodiments may vary in this regard, all as is within the ken of those skilled in the art in view of the teachings hereof.

Such a script, or "dialog facet" 16d as referred to below, may be, by way of illustrative, non-limiting example, of the form WHAT IS THE OBJECTIVE? IS IT TO <FACET_CHILDREN>. When used to generate a conversation with an end user, the dialog facet is "expanded"—i.e., the portion of its text in angle brackets is replaced by the siblings 16*d* of that dialog facet in the ontology 16*a* hierarchy—and, more specifically, by the sub-facets 16*d* that descend from the same main facet 16*c* as does the dialog facet.

Thus, for example, when applied with respect to the main facet OBJECTIVE and its sub-facets ASSESS, EDUCATE, INFLUENCE, and INFORM, the script WHAT IS THE OBJECTIVE? IS IT TO <FACET_CHILDREN> can be used to generate the query WHAT IS THE OBJECTIVE? IS IT TO ASSESS, EDUCATE, INFLUENCE AND INFORM.

Continuing the example above, combining dialog facets of the type described above with those characterizing digital assets pertaining to the insurance provides the following ontology 16*a*. Again, as above, bracketed expressions indicate whether the facets are main facets 16*c* or sub-facets 16*d*:

Audience [16*c*]
   Broker [16*d*]
   Employer [16*d*]
   Government Agency [16*d*]
   Professional organization [16*d*]
   [Dialog] What audience is this for? We have materials for <FACET.CHILDPEN>[16*d*]
Content type [16*c*]
   Articles [16*d*]
   Brochures [16*d*]
   Contracts [16*d*]
   Testimonials [16*d*]
   [Dialog] Hi there. I am the healthcare insurance sales chatbot I can help you with <FACET_CHILDREN>. What kind of Content would you like? [16*d*]
Health plan [16*c*]
   ACO [16*d*]
   HMO [16*d*]
   PRO [16*d*]
   [Dialog] Terrific. Is this for a specific plan? I can locate <FACET_CHILDREN>[16*d*]
Objective [16*c*]
   Assess [16*d*]
   Educate [16*d*]
   Influence [16*d*]
   Inform [16*d*]
   [Dialog] What is the objective? Is it to <FACET_CHILDREN>[16*d*]
Provider [16*c*]
   Assisted living [16*d*]
   Behavioral health [16*d*]
   Community-based care [16*d*]
   Urgent care [16*d*]

Though not discussed further below, such an ontology can include an additional branch defined by the main facet 16*c* DIALOGS and further defined by sub-facets comprising a compilation of the dialog facets listed in the ontology above. That additional branch is reprinted below:

Dialogs [16*c*]
   Hi there. I am the healthcare insurance sales chatbot I can help you with <FACET_CHILDREN>. What kind of Content would you like? [16*d*]
   Terrific. Is this for a specific plan? I can locate <FACET_CHILDREN>[16*d*]
   What audience is this for? We have materials for <FACET_CHILDREN>[16*d*]
   What is the objective? Is it to <FACE_CHILDREN> [16*d*]

In sum, in the illustrated embodiment, each main facet 16*c* of the hierarchy of ontology 16*a* has (i) plural sub-facets or children 16*d* that descend from it and that characterize aspects of actual assets in the CMS 14 (and store 12) or a potential such asset, as well as (ii) a dialog segment that is associated with those children and that can be used to drive a dialog with the end user in regard to those children. The dialog segment can, itself, be a sub-facet 16*d* in the ontology 16*a* and a sibling of those which it uses to drive those conversations. See FIG. 1, step (B).

Although some facets 16*b* of the ontology 16*a* correspond to tags in the CMS 14, some (e.g., dialog facets) do not. Moreover, in some embodiments, facets 16*b* in the former category may match their tags identically. Such is the case in the non-limiting, illustrative example below of facets 16*b* of ontology 16*a* and corresponding tags 14*b* of records 14*a* in CMS 14:

| Ontology 16a | | Tags 14b of CMS |
|---|---|---|
| Audience [16c] | <————> | Audience |
| Broker [16d] | <————> | Broker |
| Employer [16d] | <————> | Employer |
| Government Agency [16d] | <————> | Government Agency |
| Professional organization [16d] | <————> | Professional organization |
| [Dialog] What audience is this for? We have materials for <FACET.CHILDPEN> [16d] | | |
| Content type [16c] | <————> | Content type |
| Articles [16d] | <————> | Articles |
| Brochures [16d] | <————> | Brochures |
| Contracts [16d] | <————> | Contracts |
| Testimonials [16d] | <————> | Testimonials |
| [Dialog] Hi there. I am the healthcare insurance sales chatbot I can help you with <FACET_CHILDREN>. What kind of Content would you like? [16d] | | |
| Health plan [16c] | <————> | Health plan |
| ACO [16d] | <————> | ACO |
| HMO [16d] | <————> | HMO |
| PRO [16d] | <————> | PRO |
| [Dialog] Terrific. Is this for a specific plan? I can locate <FACET_CHILDREN> [16d] | | |
| Objective [16c] | <————> | Objective |
| Assess [16d] | <————> | Assess |
| Educate [16d] | <————> | Educate |
| Influence [16d] | <————> | Influence |
| Inform [16d] | <————> | Inform |
| [Dialog] What is the objective? Is it to <FACET_CHILDREN> [16d] | | |
| Provider [16c] | <————> | Provider |
| Assisted living [16d] | <————> | Assisted living |
| Behavioral health [16d] | <————> | Behavioral health |
| Community-based care [16d] | <————> | Community-based care |
| Urgent care [16d | <————> | Urgent care |

In the table above, correspondence between facets 16*b* of ontology 16*a* and corresponding tags 14*b* is reflected by the symbol "<————>". In practice, correspondence is reflected by metadata associated with the facets 16*b*, as discussed below, and particularly, for example, by pointers, URLs, or globally unique IDs (GUIDs) contained in that metadata. Of course, in implementations where the facets and their corresponding tags have identical values, such pointers are not necessary—since, the fact of correspondence can be determined by comparison.

Facets 16*b* of the ontology 16*a* of the illustrated embodiment are associated with metadata 16*e*, as shown in FIG. 1. For main facets 16*c* and sub-facets 16*d*, that metadata 16*e* includes (a) an identifier 16*f* of the tag in CMS 14 to which the main or sub-facet 16*c*, 16*d* corresponds, and (b) and indicator 16*g* of whether that tag is, indeed, "in use" in the CMS 14—that is, whether it has been applied to a digital asset currently accessible by the CMS 14—e.g., as opposed to tags which may be applied to potential assets but that are not applied to any such asset accessible by the CMS 14. See FIG. 1, step (B).

For main facets 16*c* (and, optionally, for sub-facets 16*d*), that metadata 16*e* can additionally include a sequence number 16*h* indicating the order in which the dialog segment(s) for that main facet (and, more particularly, for its sub-facets 16*d*) should be applied in generating a conversation with an end-user. Thus, continuing the example above, to cause the conversation to begin with a query to the end user regarding the audience that sought-after content is intended for, the AUDIENCE main facet 16*c* could be assigned a meta-data sequence number #1; and, to cause the conversation to turn, next, to the type of content, the CONTENT TYPE main facet 16*c* could be assigned a meta-data sequence number #2; all, by way of non-limiting example.

Ontology 16*a*, including its facets 16*b* and metadata 16*e*, can be stored in lists, arrays, databases or other data structures (consolidated, distributed or otherwise) of the type known in the art, as adapted in accord with the teachings hereof. The creation, maintenance and accessing of such an ontology, regardless of how stored, is within the ken of those skilled in the art in view of the teachings hereof.

Implementation of an ontology manager 16 for creation and management of an ontology 16*a* as described above and elsewhere herein is within the ken of those skilled in the art in view of the teachings hereof. Thus, for example, the facets 16*b* may be created in the manage 16 in the first instance via an administrator or other operator directly or via a batch process. Once they are created in the ontology manager 16, facets 16*b* may be associated with corresponding tags of the CMS 14 through a batch interface, a graphical user interface (GUI) or otherwise that permits an administrator or other operator to assign tags, individually or in groups, to the facets to which they correspond, again, individually or in groups, as is within the ken of those skilled in the art in view of the teachings hereof. Alternatively, or in addition, the facets 16*b* may be created in the first instance and/or placed into association with corresponding tags of the CMS by synchronization module 26.

Synchronization Module 26

Synchronization module 26 exchanges facets and/or tags with the CMS 14 and ontology manager 16 to establish correspondence between tags of the former and facets of the latter, and to identify facets that correspond to tags associated with digital assets in the content management system. See FIG. 1, step (C). The module 26 can exclude facets from the synchronization process. In the illustrated embodiment, such excluded assets include dialog facets.

The module 26, which executes on digital data processing system 22, may form part of the CMS 14 and/or the ontology manager 16; alternatively, it may comprise a separate module, as shown in the drawing. Communications between the module 26 and the CMS 14 and/or manager 16 may be via APIs, remote procedure calls and/or other computer-to-computer and/or process-to-process communication protocols as per convention in the art as adapted in accord with the teachings hereof.

In operation, the synchronization module 26 queries the CMS 14 to identify tags 14*b* employed in records 14*a* identifying digital assets 12*a* in store 12. It also identifies those tags 14*b*' that, although known to the CMS 14, are not currently so employed, i.e., tags 14*b*' for potential such assets. Likewise, the module 26 queries the ontology manager to identify facets 16*b* in the ontology 16*a*, as well as metadata 16*e* for those assets.

By comparing the tags and facets (and/or their respective metadata 16*e*), the module 26 can identify tags and/or facets that correspond with one another (e.g., by comparing the tag and facet names in embodiments that employ a like naming convention, by checking the values of metadata fields 16*f* or otherwise) and, upon making such identification, can test and set the metadata field 16*f* of the respective facet to properly reflect whether the respective tag is in use (i.e., whether it is associated with a record 14*a* that is associated with a digital asset 12*a* in store 12) or whether that tag is merely maintained in the CMS 14 for potential use in characterizing such an asset.

Upon identifying tags that do not have corresponding facets, or vice versa, the synchronization module 26 can, depending upon implementation specifics, effect creation of missing tags or facets in the CMS 14 or ontology manager 16, as the case may be and/or can alert an operator of system 10 to do so.

Synchronization module 26 of the illustrated embodiment effects the foregoing, i.e., "synching" of the CMS 14 and the ontology manager 16 upon operator request or automatically, e.g., periodically (hourly, daily, etc.) or episodically (e.g., whenever changes are made to the CMS records 14*a* and/or ontology 16), depending on implementation requirements. Implementation of the synchronization module 26 to effect the foregoing is within the ken of those skilled in the art in view of the teachings hereof.

Chat Bot 26

Chat bot 26 is anconventional such software application for driving a conversation with an end user via general- or special-purpose human machine interface 20 (such as a web browser, chat app or otherwise) and via the user's device 24, all per convention in the art as adapted in accord with the teachings hereof. Chat bot 26 of the illustrated embodiment utilizes Aspect Conversational Experience Platform (CxP), Google Dialog Flow or other conventional chatbot framework(s) of the type known in the art, whether commercially available or otherwise, all as adapted in accord with the teachings hereof. Of course, it will be appreciated that, although, the term "chat" is associated with element 26, the conversation need not be via text. It can be spoken (e.g., as where the HMI includes a text to voice feature; multi-media, as where the HMI includes graphical avatars; or otherwise, as per convention in the art as adapted in accord with the teachings hereof).

To that end, the chatbot drives conversations with the end user (via HMI 20 and device 24) utilizing scripts contained in dialog facets associated with the main facets 16*c*, as expanded using sub-facets 16*d* as discussed above. See FIG. 1, step (D). Thus, for example, reiterating the example above, in an ontology 16*a* for generating digital content vis-à-vis digital assets pertaining to insurance, a dialog facet that contains the script WHAT IS THE OBJECTIVE? IS IT TO <FACET_CHILDREN> and that is a sibling of the sub-facets ASSESS, EDUCATE, INFLUENCE, and INFORM can be used to drive a query to the end user (via HMI 20 and device 24) WHAT IS THE OBJECTIVE? IS IT TO ASSESS, EDUCATE, INFLUENCE AND INFORM as part of a conversation to identify digital assets 12 in CMS 14 of potential interest to the user.

To avoid dead-ends in the conversation, scripts are only expanded to include sibling facets 16*d* that correspond to tags 14*b* that are "in use," i.e., that correspond to digital assets 12*a* accessible via the CMS 14; those scripts are not expanded to include sibling assets 16*d* that correspond to tags 12*b*' that are not currently associated with such assets). Such operation may be by action of the ontology manager 16 and/or the chat bot 18, as is within the ken of those skilled in the art in view of the teachings hereof.

In some embodiments, the ontology's metadata additionally includes lexical indicators, identifying a language, dialect or other lexicon with which each main facet 16*c* or sub-facet is associated. In such embodiments, localization of conversations driven by the chat bot 18 is achieved by retrieving and expanding only scripts associated with a given lexical indicator or indicators.

By way of example, in an embodiment in which some facets 16*b* have meta-data identifying the respective facets as English-language and other facets have meta-data identifying the respective facts as French-language, only those scripts associated with the French-language metadata lexical indicator are retrieved and expanded (and, then, only with siblings associated that that same lexical indicator) in driving conversation with users in France or French-speaking countries.

Referring to step (E) of FIG. 1, chat bot 18 can retrieve scripts from ontology manager 16 via API, remote procedure call or otherwise, as per convention in the art as adapted in accord with the teachings hereof. In the illustrated embodiment, chat bot 18 retrieves, along with scripts, tags corresponding to the sub-facets 16*d* with which those scripts are expanded. As well, in embodiments in which the ontology's metadata additionally includes format indicators, identifying a format (e.g., text, radio box, check box or other user-interface widget) with which conversations are to be driven, those format indicators are retrieved, along with scrips and tags.

Expansion of those scripts using siblings of the sub-facets 16*d* in which the scripts are contained (and using the user-interface widget specified in a format indicator, if any, retrieved with the script) can be performed by the ontology manager 16, the chat bot 18, or otherwise, all as is within the ken of those skilled in the art in view of the teachings hereof. Whether by action of the ontology manager 16 and/or the chat bot 18, scripts are retrieved to drive the conversation in an order determined by the sequence number contained in the metadata field 16*h* of the main facet 16*c* with which that dialog facet and those sub-facets are associated.

Thus, continuing the example above, in an ontology 16*a* in which one main facet 16*c*, e.g., the main facet AUDIENCE, is assigned a meta-data sequence number of #1 and another main facet 16*c*, e.g., the main facet CONTENT TYPE, is assigned a meta-data sequence number of #2, the chat bot 18 can drive the conversation with a query generated from expansion of the dialog facet associated with main facet AUDIENCE and, once that query is responded-to by the user (via HMI 20 and device 24), with a query generated from expansion of the dialog facet associated with the main facet CONTENT TYPE. The chat bot can drive successive queries in the conversation with expanded scripts generated from the other branches (i.e., main facets and related sub-facets) of the hierarchy associated with successively increasing sequence numbers.

In the illustrated embodiment, with each user response to a query generated as discussed above, the HMI returns to the chat bot 18 one or more sub-facets designated by the user in his/her response from expanded script that made up that query. The chat bot 18 of the illustrated embodiment saves away (e.g., in a store local to the chat bot, in cookies in the user device 24 browser or otherwise) the tag(s) associated with that/those designated sub-facets. The chat bot 18 can also save away, along with those tags, a fulsome representation of the queries posed during the confirmation and the user's responses. This facilitates implementation of the conversation in a stateless manner such that a late-received response from a given user can be matched against the record of prior responses, e.g., in cookies in that user's device 24 browser or otherwise, to pick up the conversation where it had left off. Alternatively, a facet returned in such a late-received response can be matched against the ontology 16*a* hierarchy to identify the sequence number of the main facet and sub-facets associated with the script in connection with which the response was made and, thereby, to drive the conversation with the script associated with the next sequence number.

And, although, the chat bot 18 normally drives the conversation by generating queries in accord with the sequence numbers associated with scripts and their main and sub-facets, the chat bot can deviate from that sequence in instances where a given term or expression is a sub-facet of two different main facets. In such an instance, a response by the user selecting that facet, when presented with it in connection with expansion of a script associated with one of those main facets, can cause the chat bot 18 to drive the conversation with the script associated with the next sequence number from that of the other main facet.

Regardless, once the conversation has been completed, e.g., via querying the user with all of the scripts implicated by the ontology 16*a* in the order specified therewith, the chat bot passes the saved-away compilation of tags designated in the user responses to the HMI 20. See FIG. 1, step (F).

The HMI, in turn, applies those tags to CMS 14 to retrieve assets characterized by those tags or links thereto, all per convention in the art as adapted in accord with the teachings hereof. See FIG. 1, steps (G) and (H). The HMI can, in turn, generate as digital content for the user the assets returned in step (H). See FIG. 1, step (I). As a consequence, the HMI 20 and, more generally, the system 10 generates and returns to the user digital content meeting his/her responses to the queries generated by the chat bot 18 based on the scripts contained therein. \Implementation of the chat bot 18, HMI 20 and CMS 14 to effect the foregoing is within the ken of those skilled in the art in view of the teachings hereof.

Described herein are systems and methods achieving the objects set forth above for generating digital content based on retrieved assets. It will be appreciated that the embodiments described here are merely examples of the invention and that other embodiments, incorporating changes to those shown and described here fall within the scope of the invention, of which we claim the following.

In view of the foregoing, what we claim is:
1. A system for digital content generation, comprising
   A) a digital data processing system comprising a processor and a memory,
   B) a content management system executing on the digital data processing system, the content management system comprising, for each of a plurality of digital assets accessible by the content management system, one or more tags that characterize that respective digital asset, the content management system further comprising tags characterizing one or more digital assets not accessible by the content management system, C) an ontology manager executing on the digital data processing system in communications coupling with the content management system, the ontology manager comprising (i) plural facets, each corresponding to one or more of the tags and each characterizing one or more aspects of a said digital asset, and (ii) one or more scripts, each associated with one or more of the facets, and (iii) an identification of the facets that correspond to one or more of the tags that are associated with the digital assets accessible by the content management system, D) a chat bot executing on the digital data processing system in communications coupling with the ontology manager, the chat bot driving a conversation with a user through a human machine interface, the conversation comprising a sequence of one or more queries that are driven to the user by the human machine interface and one or more user responses those one or more queries received via the human machine interface, where each said query comprises one or more of the scripts and one or more of the facets, where the chat bot (i) includes in the queries only the facets identified as corresponding to one or more of the tags associated with the digital assets accessible by the content management system, and (ii) excludes from the queries the facets not so identified, E) the content management system retrieving for transmittal to the user one or more of said digital assets characterized by the tags corresponding to those facets that are (i) in the sequence of one or more queries making up the conversation, and that are (ii) selected by the user in response to those queries, and F) wherein the content management system and the ontology manager exchange any of said facets and said tags via the digital data processing system in order to (i) establish correspondence between said facets of the ontology manager and said tags of the content management system, (ii) identify said facets that correspond to said tags that are associated with digital assets accessible by the content management system.

2. The system of claim 1, wherein the content management system and the ontology manager exchange any of said facets and said tags via the digital data processing system in order to (i) establish correspondence between said facets of the ontology manager and said tags of the content management system, (ii) identify said facets that correspond to said tags that are associated with digital assets accessible by the content management system.

3. The system of claim 1, wherein the ontology manager associates sequence numbers with the plural facets, and wherein the chat bot additionally drives the conversation as function those sequence numbers.

4. The system of claim 1, wherein the ontology manager comprises one or more lexical indicators, each identifying one or more facets belonging to a common language, dialect or other lexicon, and wherein the chat bot drives the conversation as an additional function of the lexical indicator associated with facets.

5. The system of claim 4, wherein the chat bot drives the conversation to exclude scripts associated with facets not associated with one or more designated lexical indicators.

6. The system of claim 1, wherein the chat bot drives the conversation with any of text, radio boxes, check boxes and other user interface widgets.

7. The system of claim 6, wherein the ontology manager comprises one or more format indicators, and wherein the chat bot selects user interface widgets with which to drive the conversation as a function of those format indicators.

8. A method of digital content generation comprising executing on a digital data processing system, the steps of:
A) maintaining in a content management system executing on the digital data processing system for each of a plurality of digital assets accessible by that content management system one or more associated tags that characterize that respective digital asset, B) maintaining in an ontology manager executing on the digital data processing system (i) plural facets, each corresponding to one or more of the tags and each characterizing one or more aspects of any of a said digital asset, and (ii) one or more scripts, each associated with one or more of the facets, and (iii) an identification of the facets that correspond to one or more of the tags that are associated with digital assets accessible by in-the content management system, C) with a chat bot executing on the digital data processing system, driving a conversation with a user through a human machine interface, the conversation comprising a sequence of one or more queries that are driven to the user by the human machine interface and one or more user responses those one or more queries received via the human machine interface, where each said query comprises one or more of the scripts and one or more of the facets, where the chat bot (i) includes in the queries only the facets identified as corresponding to one or more of the tags associated with the digital assets accessible by the content management system, and excluding from the queries the facets not so identified, D) with the content management system, retrieving one or more of said digital assets characterized by the tags corresponding to those facets that are (i) in the sequence of one or more queries making up the conversation, and that are (ii) selected by the user in response to those queries, transmitting to those retrieved digital assets to the user, and E) exchanging, between the content management system and the ontology manager, any of said facets and said tags in order to (i) establish correspondence between said facets of the ontology manager and said tags of content management system, (ii) identify said facets that correspond to said tags that are associated with digital assets in the content management system.

9. The method of claim 8, comprising executing on the digital data processing system the step of exchanging, between the content management system and the ontology manager, any of said facets and said tags in order to (i) establish correspondence between said facets of the ontology manager and said tags of content management system, (ii) identify said facets that correspond to said tags that are associated with digital assets in the content management system.

10. The method of claim 8, comprising executing on a digital data processing system the steps of
associating sequence numbers with the plural facets, and driving the conversation as additional function those sequence numbers.

11. The method of claim 8, comprising executing on a digital data processing system the steps of
assigning one or more lexical indicators to each of one or more facets in the ontology manager, each lexical indicator representing a common language, dialect or other lexicon,
driving the conversation as an additional function of the lexical indicator associated with the facets.

12. The method of claim 11, comprising executing on a digital data processing system the step of driving the conversation to exclude scripts associated with facets not associated with one or more designated lexical indicators.

13. The method of claim 8, comprising executing on a digital data processing system the step of driving the conversation with any of text, radio boxes, check boxes and other user interface widgets.

14. The method of claim 13, comprising executing on a digital data processing system the steps of associating one or more facets with format indicators, and
selecting user interface widgets with which to drive the conversation as a function of those format indicators.

* * * * *